(12) United States Patent
Feller

(10) Patent No.: US 7,437,945 B1
(45) Date of Patent: Oct. 21, 2008

(54) MAGNETIC FLOW PROBE

(76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 0 days.

(21) Appl. No.: 12/030,950

(22) Filed: Feb. 14, 2008

(51) Int. Cl.
*G01F 1/58* (2006.01)
(52) U.S. Cl. .................. 73/861.12; 73/861.15
(58) Field of Classification Search .. 73/861.08–861.17
See application file for complete search history.

(56) References Cited

U.S. PATENT DOCUMENTS

| | | | | |
|---|---|---|---|---|
| 3,712,133 A | * | 1/1973 | Westersten | 73/861.12 |
| 5,970,799 A | * | 10/1999 | Griessmann et al. | 73/861.12 |
| 6,241,383 B1 | * | 6/2001 | Feller et al. | 374/40 |
| 6,530,285 B1 | * | 3/2003 | Feller | 73/861.15 |

* cited by examiner

*Primary Examiner*—Harshad Patel
(74) *Attorney, Agent, or Firm*—David Kiewit

(57) ABSTRACT

Problems of instability and non-linearity in probe-type magnetic flow meters are ameliorated by either or both of a conductor coating connecting a tip portion of the probe with a supporting probe stem and flat end plates parallel to the flow direction that are arranged adjacent to the sensing electrodes and that act to straighten and confine fluid flowing past the electrodes.

10 Claims, 2 Drawing Sheets

MAGNETIC FLOW PROBE

BACKGROUND OF THE INVENTION

1. Field of the Invention

This invention relates to magnetic flow sensing probes used in electromagnetic, or Faraday, flow meters.

2. Background Information

The rate of flow of a conductive fluid can be determined by measuring an electrical potential difference developed in the fluid as the fluid moves through a magnetic field. The potential difference is sensed by at least one pair of electrodes contacting the liquid and spaced apart from each other along a line that is nominally orthogonal to both the direction in which the flow is being measured and a magnetic field produced by a magnet. Some instruments of this sort are configured as in-line flow meters in which the electrodes and magnets are either built into or are very close to the wall of a pipe through which the fluid flows. Other instruments of this type are configured as insertion probes in which the electrodes are or adjacent a free end of the probe. When the probe is inserted into a flowing fluid the measurement is made at some selected distance from whatever pipe wall or other support member is used to anchor the probe in place.

A concern with flow probes in general is that a non-uniform fluid flow distribution, as may be caused by the flow impedance of the probe head, can cause the probe to vibrate. This vibration may lead to non-linear response or to mechanical failure.

A particular concern related to magnetic flow probes has been that fluid flow distribution in the neighborhood of the electrodes may not remain uniform because of the flow obstruction caused by the probe itself. At low flow rates the fluid tends to change course in the vicinity of the probe and may be deflected away from the electrodes so as to reduce the measured signal. This can result in a nonlinear relation between the flow-generated electrode signal and the flow rate even in the absence of perceptible vibration. Other nonlinearities may be caused at intermediate and higher velocities by the fluid impinging on portions of the probe distal from the electrodes. Additional nonlinearities due to the proximity of the pipe wall to the head may also occur.

Another concern is that in some magnetic flow probes the electrodes may be held in an electrically insulating head at the end of a stem. In these cases the electrically conductive area available for grounding the probe to the fluid may be limited to the stem portion of the probe. Unless such a probe is used in a relatively small diameter metallic pipe, this lack of grounding can lead to unstable and noisy operation.

BRIEF SUMMARY OF THE INVENTION

An aspect of a preferred embodiment the present invention is that it provides a way to reduce nonlinearities in the observed relation between fluid flow rate and output signal in a magnetic flow meter by controlling flow past a set of electrodes. To this end, one embodiment of the invention provides a generally paddle-shaped electromagnetic flow probe for measuring a rate of flow of a fluid along a flow direction. This probe comprises a stem portion that can be anchored to a fixed support and a blade-like measurement head supporting at least one pair of electrodes exposed on at least one of the faces of the blade and spaced apart along an axis of the probe. In use, the stem portion is inserted into the fluid so that the axis of the probe is transverse to the flow direction. In this orientation the two opposing electrically insulating head faces that support the electrodes are aligned along the flow direction. In addition, there is a magnet within the head that is arranged to provide a magnetic field extending outwardly from its faces. There are also two end plate portions disposed adjacent respective ends of the head portion. Each of the end plate portions extends outwardly from a respective face of the head portion so that each end plate portion is aligned parallel to the flow direction.

Another aspect of preferred embodiments of the present invention is that they provide improved grounding for a magnetic flow probe. To this end, one aspect of the invention is that it provides an electromagnetic flow probe having a paddle-like shape and comprising an electrically conductive stem portion for insertion into the fluid so that an axis of the probe is transverse to the flow direction and so that two opposing electrically insulating faces of a head portion of the probe are aligned along the flow direction. In this embodiment there is at least one pair of electrodes exposed on at least one of the faces of the head portion of the probe and spaced apart along an axis of the probe. In addition, a magnet is disposed within the head portion and arranged to provide a magnetic field extending outwardly from its faces. Moreover, an electrically conductive coating disposed on at least one of a leading or a trailing edge of the head, as well as on a tip portion of the head, may be electrically connected to the stem.

In a preferred embodiment of the invention fluid flow in the vicinity of the blade-shaped sensing head is bounded by generally flat-surfaced plates at each end of the head to straighten and confine the flow within the area of the electrodes. The plates are typically semi-circular in shape and are generally selected to have a diameter that allows the probe to pass through a valve as may be required for hot tap mounting.

When a surface of each plate distal from the electrodes is made electrically conductive and is electrically grounded, the plates provide a substantial amount of surface area for electrically grounding the fluid. That area is particularly effective because it is not localized. When the electrical connections between the plates and stem, or other grounding connections, are exposed to the fluid, the total grounding area is increased further. The plate surfaces adjacent the electrodes may be electrically insulated to minimize the shunting effect on the flow generated electrode voltages.

Yet another aspect of some embodiments of the present invention is that they provide a flow plate structure operable to suppress vibrations of the probe head. The flow obstruction offered by the probe head and stem, characteristic of a bluff body, typically produces vortices that tend to vibrate the stem perpendicular to a plane defined by the flow & the stem. Providing an extended paddle-like face aligned with the flow inhibits this process. The provision of end plates further inhibits vibration by straightening the fluid flow streamlines, capturing flow near the electrodes, and coupling the head more tightly to the fluid.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

DETAILED DESCRIPTION OF A PREFERRED EMBODIMENT

Figure 1:
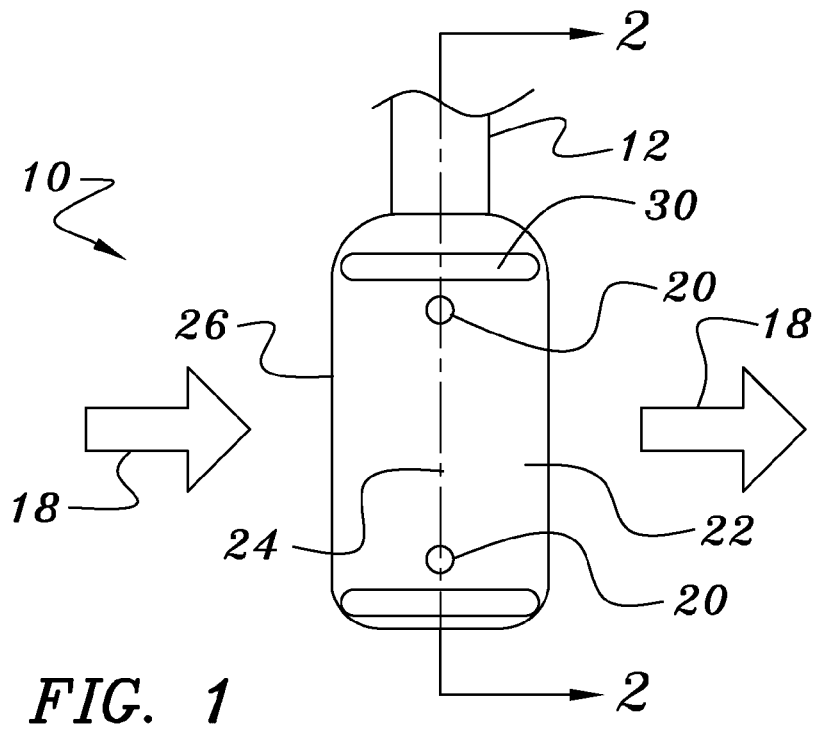
FIG. 1 is an elevational view of a portion of magnetic flow probe of the invention, the view taken perpendicular to both a direction of fluid flow and of a face of a probe head.

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. At the outset of the description, it may be noted that the term 'paddle-shaped' and paddle-like refer to a shape analogous to an oar or single-ended canoe paddle comprising a shaft or stem having a blade-like head at one end thereof. In this usage, the term 'blade-like' implies a shape having two faces that may be flat or lenticular, that extend along an axis of a probe stem and that are oriented parallel to a flow direction when the sensor is in use. The blade-like shape further implies the presence of leading and trailing edge portions, which may have a minimal extent or which may be nearly as wide as the maximum thickness of the blade-like head. The edge portions are oriented transverse to the flow direction when the blade faces are parallel to it.

A magnetic flow probe 10 may have a paddle-like shape comprising a stem portion 12 and a blade-shaped sensing head portion 14 that contains a magnet 15 for generating a magnetic field transverse to a fluid flow direction 18. The magnet is generally an electromagnet that comprises windings 16 and that may comprise a core 17. The head supports at least one pair of sensing electrodes 20 spaced apart along a direction that is ideally orthogonal to both the flow direction and the magnetic field, but that may be skewed from either of them. These electrodes 20 are necessarily electrically insulated from each other so that they can be used to measure a voltage representative of the fluid flow.

In a preferred embodiment a blade-like sensing head 14 has two generally parallel faces 22 that, when the probe is installed, are selectively oriented along the flow direction. The length of these faces 22, as measured along the probe axis 24, is selected to provide adequate spacing for the voltage sensing electrodes. In a preferred embodiment a pair of electrodes is arranged on each of the faces 22.

The size of a magnet embedded in the sensing head sets a limit on the thickness of the head as measured in a direction perpendicular to the faces. In order to minimize flow disturbances caused by the presence of the head, the flow-facing edge portions 26 of the head may be rounded, or the entire blade-shaped head may have a lenticular cross-section with very narrow leading and trailing edge portions. Even though flow disturbances can be reduced somewhat by streamlining the head, the fluid flow streams take the route of least resistance and may deviate from parallel paths because of the obstruction represented by the head. At higher flow rates inertial effects tend to keep these flow paths more nearly parallel, and this change in flow distribution with flow rate commonly leads to measurement nonlinearities.

Figure 2:
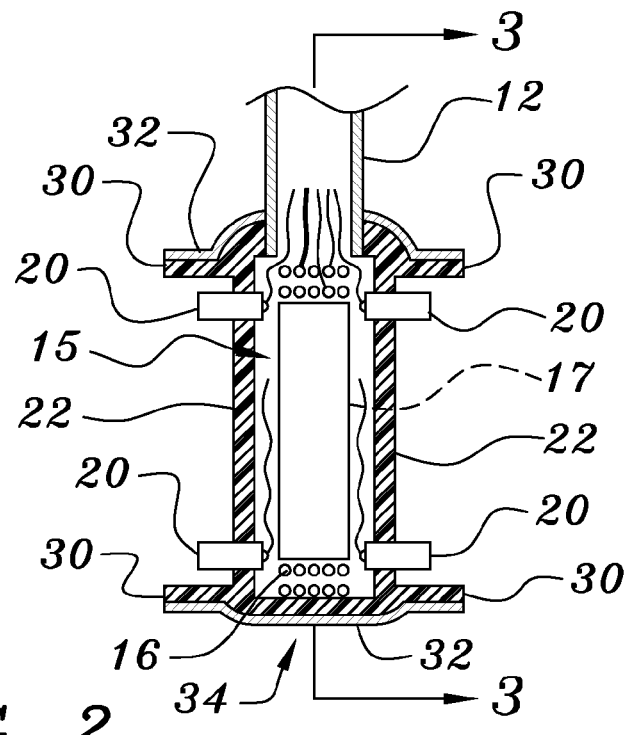
FIG. 2 is a cross-sectional view of a probe similar to that of FIG. 1, the view taken as indicated by the arrows 2-2 in FIG. 1, wherein the dimensions in the face-to-face direction have been exaggerated in the interest of clarity of presentation.

In a preferred embodiment of the invention a paddle-shaped sensing head 14 comprises end plates 30 extending outwardly from each face. The end plates may be formed integrally with the head, as depicted in FIG. 2, or made separately and attached to the sensing head by adhesives, welding, or other attachment means known in the art. The maximum lateral extent of these plates, as noted above, is generally limited by the diameter of a valve or other opening though which the probe is inserted into a pipe 28. These plates act to confine the flowing fluid and prevent flow streams from deviating from parallel paths. This confining action aids in isolating the flow paths from proximity effects of pipe walls so that the probe may be located closer to a pipe wall as probe calibration is less affected by the size of the pipe in which it is mounted. Moreover, this sort of flow confinement has been observed to suppress flow-induced vibration of the probe, which is known to lead to measurement error and, in severe cases, to mechanical failures.

Figure 3:
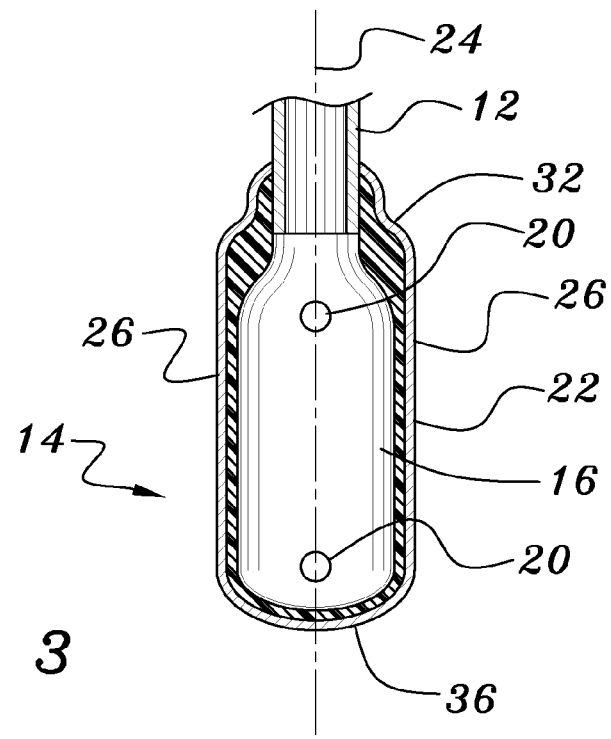
FIG. 3 is a cross section the flow probe of FIGS. 1 and 2 from which the electromagnet has been omitted in the interest of clarity, the section indicated by the arrow 3-3 in FIG. 2.

As noted above, an additional concern with magnetic flow probes is that of adequately grounding the fluid in the vicinity of the probe head 14. In a preferred embodiment of the invention, the provision of an electrically conductive coating 32 on portions of the sensing head leads to improved grounding. In particular, an increased fluid grounding area is afforded by putting a conductive coating on the surfaces of the end plates that are distal from the electrodes and connecting those surfaces to the electrically conducting surface of the stem portion of the probe. In one tested embodiment the distal surfaces of the end plates were made of polysulfone coated with a conductive filled polymer composite comprising epoxy resin and a nickel powder filler. A conducting ribbon of this composite was formed on the leading and trailing edge faces 26 of the blade-like head 14 in order to electrically connect the stem 12 to the tip portion 34 of the head distal from the stem. In a particular preferred embodiment, the conductive coating was formed with a gap 36, as depicted in FIG. 3, at the tip 34 of the sensing head. This gap, which is aligned parallel to the axis of the magnet winding, avoids having a highly conductive loop appearing as a shorted secondary turn to the electromagnet.

Although the tested embodiment provided satisfactory performance, other fabrications are also possible. These comprise, without limitation, the use of metallic end plates having an electrically insulating coating on the side adjacent the electrodes as well as the use of metal foil banding to form electrical connections between the portion of the head adjacent to the stem and the tip portion of the head that is distal therefrom.

Figure 4:
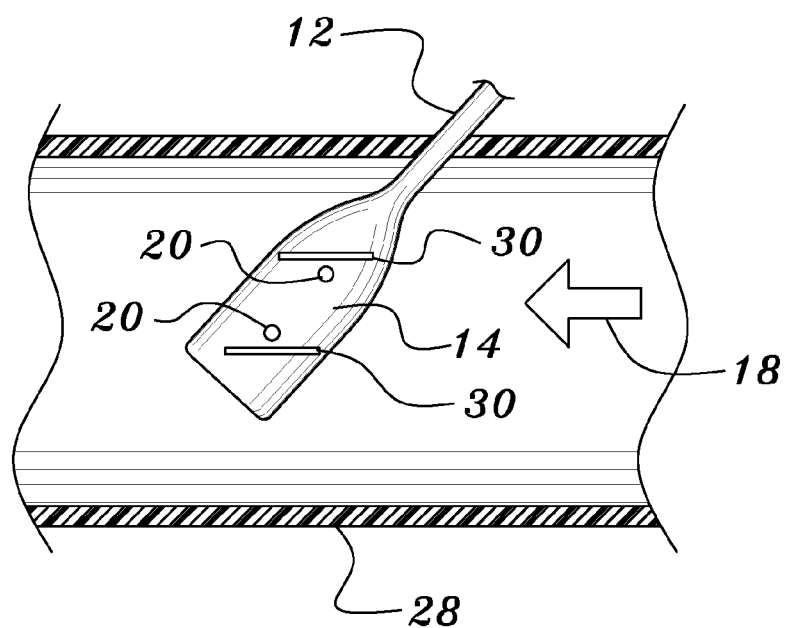
FIG. 4 is an partly schematic view of an alternate embodiment of the invention mounted in a sectioned pipe, the view taken perpendicular to both a direction of fluid flow and of a face of a probe head.

Magnetic flow probes are generally oriented as nearly perpendicular to a flow direction as is possible, but sometimes such probes are intentionally skewed along the flow direction, as depicted in FIG. 4. This may be done, for example, to aid in shedding whatever solid debris or trash is carried by the flowing fluid. In these cases, the end plates discussed above are skewed with respect to the stem of the probe at a complementary angle so that the plane of the end plates is aligned with the flow direction.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. An electromagnetic flow probe for measuring a rate of flow of a fluid along a flow direction, the probe having a paddle-like shape, the probe comprising:
    a stem portion for insertion into the fluid so that an axis of the probe is transverse to the flow direction and so that two opposing electrically insulating faces of a blade-shaped head portion of the probe are aligned along the flow direction;
    at least one pair of electrodes exposed on at least one of the faces of the head portion of the probe and spaced apart along the axis of the probe;
    a magnet disposed within the head portion and arranged to provide a magnetic field extending outwardly from at least one face thereof; and
    end plate portions disposed adjacent respective ends of the head portion, each of the end plate portions aligned parallel to the flow direction and extending outwardly from a respective face of the head portion.

2. The flow probe of claim 1 wherein each of the end plate portions comprises an electrically conductive face distal from the electrodes and an electrically insulating face adjacent the electrodes and wherein the stem portion is electrically connected to the respective electrically conductive face of each of the end plate portions.

3. The flow probe of claim 1 wherein the axis of the probe is perpendicular to the flow direction and each of the end plate portions is aligned perpendicular to the axis of the probe.

4. The flow probe of claim 1 wherein the axis of the probe is skewed with respect to the flow direction by a selected angle and each of the end plate portions is skewed with respect to the axis of the probe by a second angle that is the complement of the selected angle.

5. The flow probe of claim 1 comprising two pairs of electrodes respectively disposed on the two faces of the head portion and wherein the magnet is arranged to provide a magnetic field extending outwardly from both of the faces.

6. An electromagnetic flow probe for measuring a rate of flow of a fluid along a flow direction, the probe having a paddle-like shape, the probe comprising:
    an electrically conductive stem portion for insertion into the fluid so that an axis of the probe is transverse to the flow direction and so that two opposing electrically insulating faces of a blade-shaped head portion of the probe are aligned along the flow direction;
    at least one pair of electrodes exposed on at least one of the faces of the head portion of the probe and spaced apart along an axis of the probe;
    a magnet disposed within the head portion and arranged to provide a magnetic field extending outwardly from at least one face thereof; and
    an electrical conductor disposed on at least one of a leading and a trailing edge of the head portion and on a tip portion of the head, the conductor electrically connecting the tip portion to the stem portion.

7. The flow probe of claim 6 further comprising two end plate portions disposed adjacent respective ends of the head portion, each of the end plate portions extending outwardly from a respective face of the blade portion so that each end plate portion is aligned parallel to the flow direction, each of the end plate portions having an insulating face adjacent the electrodes and an electrically conductive face distal therefrom, each of the end plate conductive faces electrically connected to the stem portion.

8. The flow probe of claim 6 wherein at least a portion of the electrical conductor comprises a metal foil.

9. The flow probe of claim 6 wherein at least a portion of the electrical conductor comprises a conductive filled polymer.

10. The flow probe of claim 6 further comprising a gap in the electrical conductor on the head, the gap disposed parallel to an axis of the magnet winding.

* * * * *